United States Patent [19]

Letersky

[11] Patent Number: 5,256,312
[45] Date of Patent: Oct. 26, 1993

[54] APPARATUS AND METHOD FOR FILTERING OUT PARTICULATES AND IMPURITIES USING AN INFLATABLE SEAL

[76] Inventor: Leonard A. Letersky, 139 North St., Bristol, Vt. 05443

[21] Appl. No.: 907,584

[22] Filed: Jul. 2, 1992

Related U.S. Application Data

[63] Continuation-in-part of Ser. No. 588,230, Sep. 25, 1990, abandoned.

[51] Int. Cl.$^5$ .................................................. B01D 29/13
[52] U.S. Cl. ........................................ 210/767; 210/495; 210/497.2; 210/499; 55/502; 55/DIG. 31
[58] Field of Search ............... 210/767, 483, 489, 490, 210/497.2, 499, 486, 495; 55/DIG. 31, 502; 277/9, 34, 69

[56] References Cited

U.S. PATENT DOCUMENTS

| | | | |
|---|---|---|---|
| 3,849,092 | 11/1974 | Bakke et al. | 55/502 |
| 4,082,525 | 4/1978 | Allan | 55/502 |
| 4,626,265 | 12/1986 | Adiletta | 55/DIG. 31 |
| 4,732,675 | 3/1988 | Badalata et al. | 210/314 |
| 5,075,000 | 12/1991 | Bernard et al. | 210/168 |

Primary Examiner—Robert A. Dawson
Assistant Examiner—W. L. Millard
Attorney, Agent, or Firm—Thomas N. Neiman

[57] ABSTRACT

The apparatus comprises a pneumatically sealed filter assembly which provided a tight coupling between a filter and a mounting frame for preventing unfiltered fluids, such as air, from bypassing the filter. The apparatus comprises a filter, a mounting frame and an inflatable sealing assembly of substantially uniform thickness which forms a seal between the filter and the mounting frame. The inflatable sealing assembly is a low pressure seal, maintaining a maximum pressure of ten pounds per square inch.

7 Claims, 2 Drawing Sheets

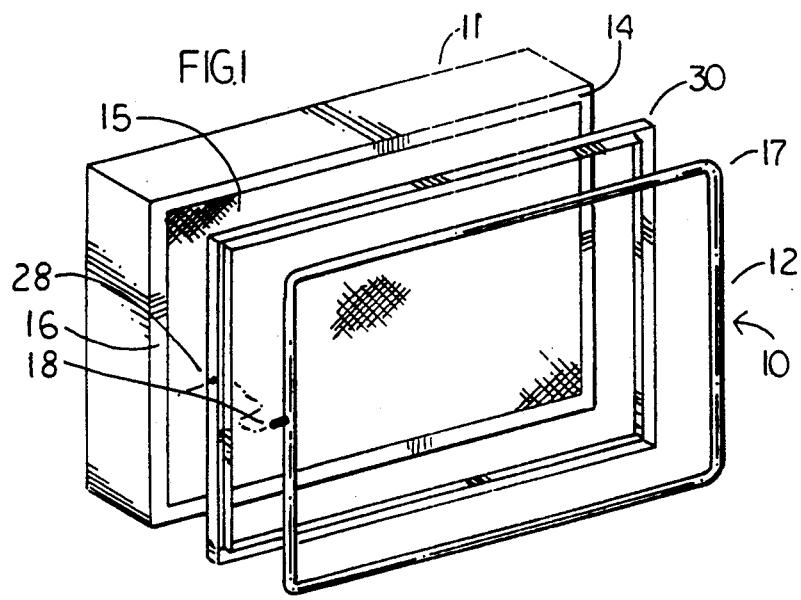
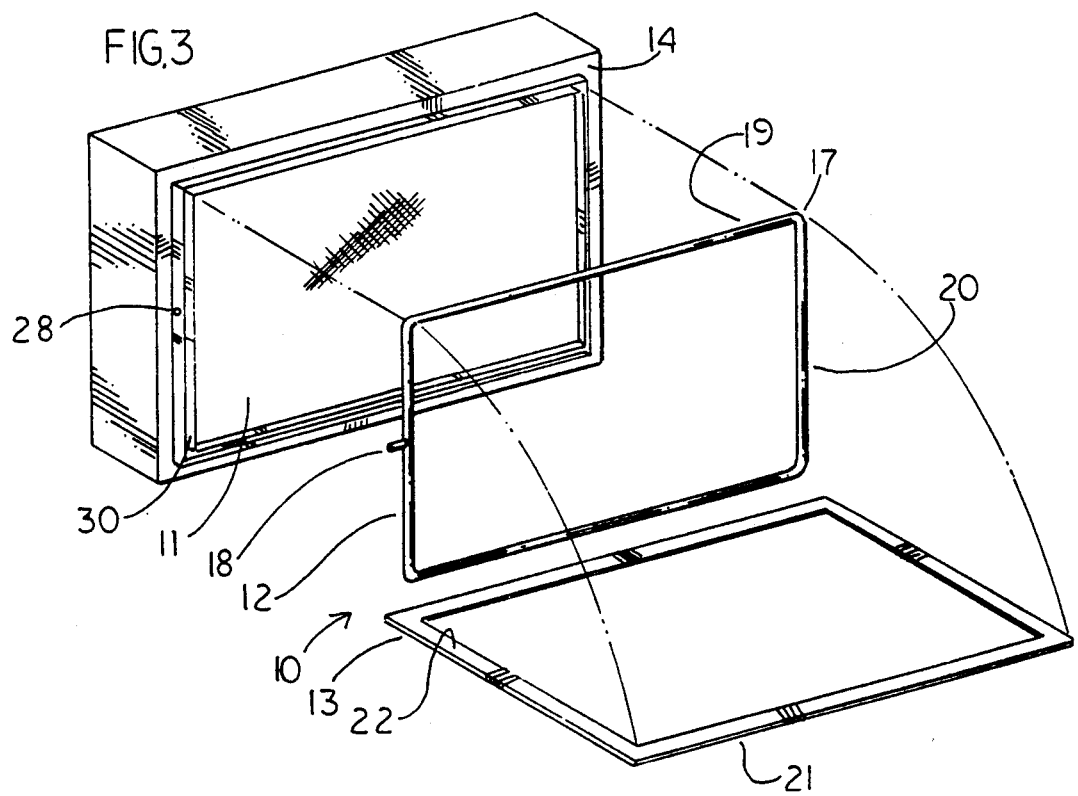

APPARATUS AND METHOD FOR FILTERING OUT PARTICULATES AND IMPURITIES USING AN INFLATABLE SEAL

This application is a continuation-in-part application of my copending application, Ser. No. 07/588,230, filed Sep. 25, 1990, now abandoned.

BACKGROUND OF THE INVENTION

This invention pertains to filtering apparatus which includes a sealing device for preventing the escape of unfiltered fluids.

For some time industry and government have required clean rooms for using sophisticated electronic equipment, performing scientific experiments and manufacturing various high technology components. Devices such as electronic computers, and certain manufacturing processes tend to be highly sensitive to microscopic foreign objects and impurities in the air. Exposure to particulates can render these costly devices inoperative, requiring repair replacement. Thus the downtime caused by particulate contamination can be devastating to the profitability of a business.

Faced with these difficulties, operations have designed clean rooms utilizing air filtration systems for dealing with those problems. These generally consist of a pump, a mounting frame, a sealing device and a particulate filter. The sealing device prevents air from bypassing the filter and entering the clean room in an unfiltered state. Previously, two varieties of sealing devices have been utilized. Some manufacturers have provided a rubber grommet as a seal. Unfortunately, grommets tend to have memory and relax into a compressed position and do not continue to press against the surface of the filter. Another approach is to use gel seals.

Unfortunately, gel seals give off gases which can cause an number of environmental, manufacturing and health problems. Additionally removing the filter irreparably damages the seal.

It is the object of this invention to teach a pneumatically sealed filter assembly which avoids the disadvantages and limitations, recited above. Another object of this invention is to provide a device that is simple to install, extremely effective and very cost effective for filtering out particulates and impurities.

SUMMARY OF THE INVENTION

Particularly, it is the object of this invention to teach an apparatus for filtering out particulates and impurities, comprising filter means for filtering out particulates and impurities; mounting means for receiving the filter means; and inflatable sealing means being of substantially uniform thickness for creating a seal between the filter means and the mounting means, said inflatable sealing means having a filter side and a mounting side, the filter side being positioned against the filter means, and the mounting side being positioned against the mounting means, the inflatable sealing means preventing fluids from escaping between the mounting means and the filter means and thereby bypassing the filter means; and said inflatable sealing means comprising pressure means limited to holding a maximum pressure of ten pounds per square inch. It is also the object of this invention to teach a method for creating a fluid-tight seal between a filter means for filtering out particulates and impurities and a mounting means for receiving the filter means, comprising interposing a fluid-filled inflatable sealing means between the filter means and the mounting means; the inflatable sealing means comprising a substantially uniform thickness; the inflatable sealing means further comprising a filter side and a mounting side, the filter side being positioned against the filter means, and the mounting side being positioned against the mounting means, the inflatable sealing means preventing fluids from escaping between the mounting means and the filter means and thereby bypassing the filter means, the inflatable sealing means being limited to a maximum pressure of ten pounds per square inch.

BRIEF DESCRIPTION OF THE DRAWINGS

Further objects and features of this invention will become more apparent by reference to the following description taken in conjunction with the following figures, in which:

FIG. 1 is an exploded perspective view of a filtering apparatus constructed according to a preferred embodiment of the present invention;

FIG. 3 is an exploded perspective view of a filter assembly constructed with a mounting frame;

DETAILED DESCRIPTION OF THE PREFERRED EMBODIMENT

Figure 2:
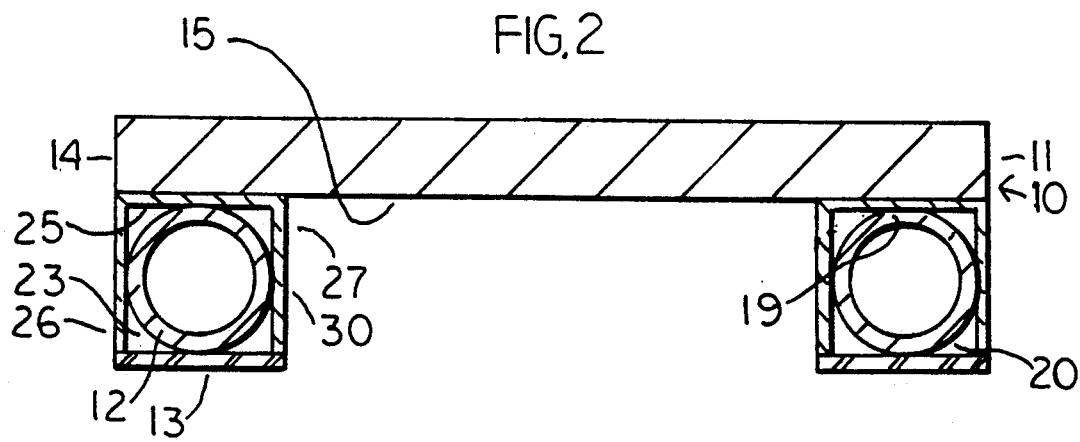
FIG. 2 is a cross-sectional view of a portion of an inflatable portion, frame and filter of the sealing assembly of FIG. 1.

As shown in the figures, the novel apparatus 10 comprises a filter assembly 11, an inflatable sealing assembly 12 and a mounting frame 13. The filter assembly 11 includes a filter frame 14 and filtering material 15. The filtering frame 14 surrounds and is coupled to the filtering material 15. The filtering frame 14 has a first side 16 that has as extrusion that forms a seal channel 30 and a second side (not shown) which is apposite to the first side 16. The filtering material is adapted to filter out particulates and impurities from fluids, such as air, passing therethrough.

The first side 16 of the filter frame 14 is adapted for flush mounting against the inflatable sealing assembly 12 which is surrounded by the seal channel 30. The inflatable sealing assembly is tube shaped and flexible to accommodate different shapes of filters. The inflatable sealing assembly 12 has an inflatable portion 17 of substantially uniform thickness, is resilient and includes at least one valve 18, for adding or removing air or other fillant from the inflatable portion 17 of the inflatable sealing assembly 12 up to and including a maximum pressure of ten pounds per square inch. The inflatable portion 17 of the inflatable sealing assembly 12 has two sides, a filter side 19 and a mounting side 20. In operation the filter side 19 is positioned against the seal channel 30 of the filter frame 14.

The mounting frame 13, as shown in FIG. 3, has an exterior rim 21 and two sides, a first side 22 and an opposite second side (not shown). The exterior rim 21 may be coupled to a structure such as a wall, ceiling or laminar flow hood. The seal channel 30 of the filter assembly 11 includes a channel portion 25 which forms a closed curve surrounding the central aperture 23 in the seal channel 30. The channel portion 25 has two upstanding walls 26 and 27. The walls are substantially perpendicular to the seal channel 30. The channel portion 25 and the seal channel 30 have one or more valve apertures 28. The apertures 28 are adapted to receive the valves 18 from the inflatable sealing assembly 12. Additional valves may be added. The mounting frame 13 can be attached in a number of ways to the filter assembly, such as clamps snaps etc.

Figure 4:
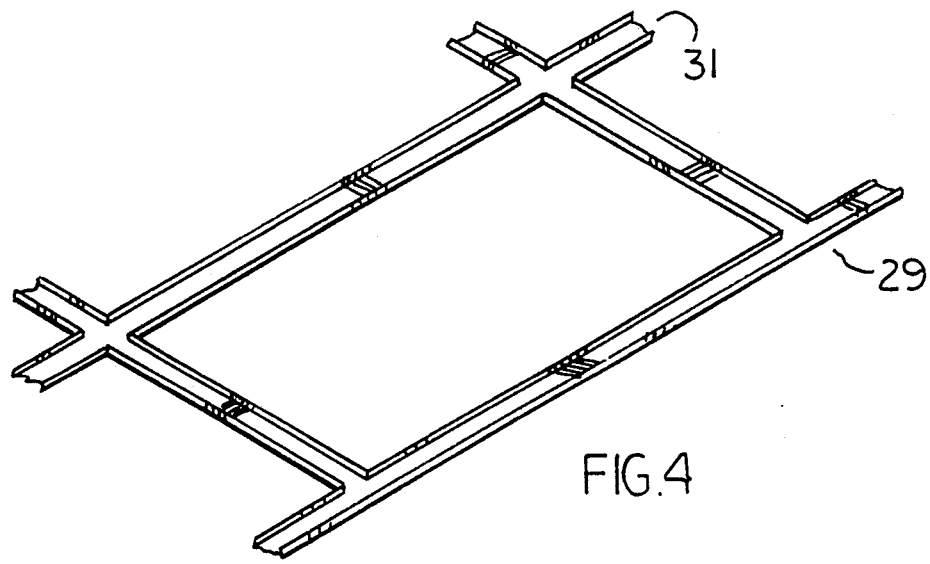
FIG. 4 is a perspective view of a mounting frame in a grid constructed according to an alternative embodiment of the present invention.
Figure 5:
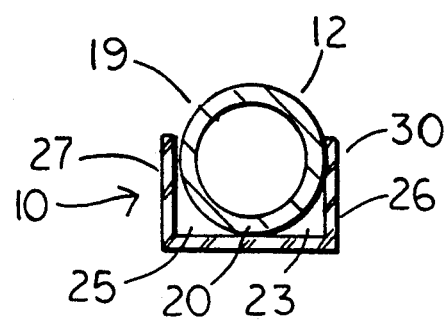
FIG. 5 is a side cross-sectional view of the sealing channel and the sealing means.

A number of alternative embodiments can be designed using the same basic structure. A grid mounting assembly 29, shown in FIG. 4, comprises a plurality of mounting frames that are interconnected to each other at an exterior rim forming a grid 31. This embodiment permits an entire wall or ceiling to consist of filter panels.

In operation, the user selects one of the valves and pumps air into the valve up to a maximum pressure of ten pounds per square inch. The inflatable sealing assembly exerts the desired pressure against the mounting frame and the filter assembly. The inflatable sealing assembly is designed to be a low pressure assembly and is manufactured to contain no more than ten pounds per square inch. The pressure exerted by the inflatable sealing assembly against both the mounting frame and the filter assembly prevents unfiltered air or unfiltered fluids from bypassing the filter assembly. When changing the filters, the user simply bleeds the air from the valve, replaces the filter and inflates the inflatable sealing assembly through the valves to the desired pressure and is ready to resume operations.

While I have described my invention in connection with specific embodiments thereof, it is clearly to be understood that this is done only by way of example and not as a limitation to the scope of my invention as set forth in the objects thereof and in the appended claims.

I claim:

1. Apparatus for filtering out particulates and impurities, comprising:

filter means for filtering out particulates and impurities;

said filter means having a channel portion, comprising two spaced apart walls, extending from a first side of said filter means, forming a closed curve around a central area, engagable with a side of an inflatable sealing means;

mounting means for receiving the filter means;

said inflatable sealing means being of substantially uniform thickness for creating a seal between the filter means and the mounting means, said inflatable sealing means having a filter side and a mounting side, the filter side being positioned against the filter means, and the mounting side being positioned against the mounting means, the inflatable sealing means preventing fluids from escaping between the mounting means and the filter means and thereby bypassing the filter means; and said inflatable sealing means comprising pressure means limited to holding a maximum pressure of ten pounds per square inch.

2. Apparatus for filtering out particulates and impurities, according to claim 1, wherein:

said filter means comprising a filter frame defining a central area, said filter frame comprising a first side flush mountable against the filter side of the inflatable sealing means and a second, opposite side; and said central area comprising a filtering material for filtering out particulates and other impurities and coupled to said filter frame.

3. Apparatus for filtering out particulates and impurities, according to claim 2, wherein:

said filter frame defines a valve aperture for receiving a valve.

4. Apparatus for filtering out particulates and impurities, according to claim 1, wherein:

said inflatable sealing means comprising an inflatable portion for receiving a fillant, and includes at least one deformable wall.

5. Apparatus for filtering out particulates and impurities, according to claim 4, wherein:

said inflatable means further comprising at least one valve means having an open and closed position, said valve means allowing said fillant to be added or removed from the inflatable portion when said valve means is in its open position and not allowing said fillant to be added or escape when said valve means is in its closed position.

6. Apparatus for filtering out particulates and impurities, according to claim 1, wherein:

said filter means having connecting means for coupling said filter means to said mounting means.

7. A method for creating a fluid-tight seal between a filter means for filtering out particulates and impurities and a mounting means for receiving the filter means, comprising interposing a fluid-filled inflatable sealing means between the filter means and the mounting means; the filter means having a channel portion comprising two spaced apart walls extending from a first side of the filter means and forming a closed curve around a central means engagable with a side of the inflatable sealing means: the inflatable sealing means comprising a substantially uniform thickness; the inflatable sealing means further comprising a filter side and a mounting side, the filter side being positioned against the filter means, and the mounting side being positioned against the mounting means, the inflatable sealing means preventing fluids from escaping between the mounting means and the filter means and thereby bypassing the filter means, the inflatable sealing means being limited to a maximum pressure of ten pounds per square inch.

* * * * *